(12) United States Patent
Huh et al.

(10) Patent No.: US 8,882,624 B1
(45) Date of Patent: Nov. 11, 2014

(54) POWER TRANSMISSION DEVICE FOR HYBRID VEHICLE

(71) Applicant: Hyundai Motor Company, Seoul (KR)

(72) Inventors: Jun Hoi Huh, Gyeonggi-do (KR);
Buhm Joo Suh, Gyeonggi-do (KR);
Seok Joon Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/048,444

(22) Filed: Oct. 8, 2013

(30) Foreign Application Priority Data

May 22, 2013 (KR) .................. 10-2013-0057580

(51) Int. Cl.
*F16H 37/06* (2006.01)
*B60K 6/547* (2007.10)

(52) U.S. Cl.
CPC .............. *B60K 6/547* (2013.01); *Y10S 903/902* (2013.01)
USPC ................................ 475/151; 475/5; 903/902

(58) Field of Classification Search
USPC ............. 475/5, 149–151, 220, 269, 296, 329, 475/330
See application file for complete search history.

(56) References Cited

U.S. PATENT DOCUMENTS

| 7,473,201 | B2 * | 1/2009 | Raghavan et al. | 475/5 |
| 2008/0121447 | A1 * | 5/2008 | Lang et al. | 180/65.2 |
| 2009/0176611 | A1 * | 7/2009 | Avery | 475/5 |
| 2011/0160015 | A1 * | 6/2011 | Ren et al. | 475/5 |
| 2013/0012347 | A1 * | 1/2013 | Ortmann et al. | 475/5 |
| 2013/0345010 | A1 * | 12/2013 | Kaltenbach et al. | 475/5 |

FOREIGN PATENT DOCUMENTS

| JP | 2010069980 A | 4/2010 |
| KR | 10-2008-0011486 | 2/2008 |
| KR | 10-2010-0088226 | 8/2010 |
| KR | 10-2012-0140098 | 12/2012 |

* cited by examiner

*Primary Examiner* — Justin Holmes
(74) *Attorney, Agent, or Firm* — Edwards Wildman Palmer LLP; Peter F. Corless

(57) ABSTRACT

A power transmission device for a hybrid vehicle includes a series-parallel type power transmission path capable of varying an engine output for each driving mode, using a Ravigneaux gear train and two or more clutches, to improve the fuel efficiency of the hybrid vehicle. The power transmission device includes two or more kinds of engine fixing gear stages capable of distributing the output of the engine to a driving wheel, which are implemented using the Ravigneaux gear train, in which a single pinion planetary gear is integrally configured with a double pinion planetary gear including a carrier obtained by combining two pinion gears with the two or more clutches.

18 Claims, 6 Drawing Sheets

POWER TRANSMISSION DEVICE FOR HYBRID VEHICLE

CROSS-REFERENCE TO RELATED APPLICATION

This application claims under 35 U.S.C. §119(a) the benefit of Korean Patent Application No. 10-2013-0057580 filed May 22, 2013, the entire contents of which are incorporated herein by reference.

BACKGROUND (a) Technical Field

The present invention relates to a power transmission device for a hybrid vehicle. More particularly, the present invention relates to a power transmission device for a hybrid vehicle, which implements a series-parallel type power transmission path capable of varying an engine output for each driving mode, preferably using a Ravigneaux gear train and two or more clutches, thereby improving the fuel efficiency of the hybrid vehicle.

(b) Description of the Related Art

In general, a power transmission device for a hybrid vehicle can be configured in various combinations, using an engine and a motor, where the power transmission device typically includes a serial power train, a parallel power train, a series-parallel power train, and the like. In particular, the serial power train allows driving of the vehicle to be performed through driving of the motor in a state in which the engine serves only as a power generator, and the parallel power train allows driving of the vehicle to be performed by combining power of the engine with power of the motor. The serial-parallel power train allows driving of the vehicle to be performed using the engine and the motor together. In this case, the power of the motor or engine is distributed according to driving conditions.

FIG. 8 is a power transmission system diagram showing one configuration example of a conventional series-parallel power train for a hybrid vehicle. The series-parallel power train includes an engine 1, a first motor (MG1) for generation, a second motor MG2 for driving, a first gear 2-1 connected to the second motor MG2, a second gear 2-2 connected to the engine 1 by a clutch 6, a third gear 2-3 simultaneously engaged with the first gear 2-1 and the second gear 2-2, and an output gear 3 outputting power to a driving wheel 7 while keeping the same axle with the third gear 2-3. Accordingly, a first HEV driving mode and a second HEV driving mode are implemented as well as an EV driving mode.

EV Driving Mode

The EV driving mode is a driving mode in which the initial low-speed driving of the vehicle is performed through only driving of the second motor MG2. In the EV driving mode, the driving of the vehicle is performed by driving only the second motor MG2 based on power of the battery 4 in a state in which the engine 1 and the first motor MG1 are stopped. The driving force of the second motor MG2 is transmitted to the output gear 3 through the first gear 2-1 and the third gear 2-3 and then transmitted to the driving wheel 7, thereby performing the driving of the vehicle.

First HEV Driving Mode

Like the EV driving mode, the first HEV driving mode is a driving mode in which the initial low-speed driving of the vehicle is performed through only driving of the second motor MG2. Particularly, the first HEV driving mode includes transmitting power of the engine 1 to a driving gear 8 of the first motor MG1 through an input gear 5 at the same time when the engine 1 is started, generating power by driving the first motor MG1 using power of the engine 1, and charging electric power generated by the first motor MG1 in the battery 4.

Second HEV Driving Mode

The second HEV driving mode is a driving mode in which the high-speed driving of the vehicle is performed using power of the engine 1 as auxiliary power in addition to power of the second motor MG2. The second HEV driving mode includes transmitting power of the engine 1 to the second gear 2-2 through the clutch and simultaneously transmitting the power to the third gear 2-2 engaged with the second gear 2-2, and transmitting the power of the engine 1 to the driving wheel 7 through the output gear 3 connected to the third gear 2-3 on the same axle and a reduction gear.

However, the conventional series-parallel power transmission device described above has at least the following disadvantage.

The input/output path through which the power of the engine is transmitted to a final output gear is limited as one path in the engagement of an engine fixing gear stage, i.e., the clutch. Therefore, there is little possible improvement of fuel efficiency as compared to a conventional vehicle.

In other words, the gear train disposed on the power transmission path through which the output shaft of the engine is connected to the final output gear, i.e., the input/output path of engine power, is combined into a structure in which the third gear and the output gear are simply connected in addition to the spur gear-type second gear, and therefore, the engine power is not appropriately distributed to the driving wheel according to the speed of the vehicle. Accordingly, it is difficult to attain improvements of fuel efficiency.

SUMMARY

The present invention provides a power transmission device for a hybrid vehicle, in which two or more kinds of engine fixing gear stages capable of distributing the output of an engine to a driving wheel are implemented using a Ravigneaux gear train in which a single pinion planetary gear is integrally configured with a double pinion planetary gear including a carrier obtained by combining two pinion gears, two or more clutches, etc., thereby improving fuel efficiency as compared with existing series-parallel power trains.

In one aspect, the present invention provides a power transmission device for a hybrid vehicle, including: an engine; a first motor for generation, connected to a first input shaft from the engine on the same axle; a first planetary gear set connected to the first input shaft extended from the engine via the first motor so that power of the engine is transmitted from the first planetary gear set to the first input shaft; a first clutch mounted at an end portion of the first input shaft, so as to transmit or disconnect the power of the engine to or from any one of a plurality of operational elements of the first planetary gear set through a second input shaft; a second clutch mounted at the end portion of the first input shaft, so as to transmit or disconnect the power of the engine to or from another of the plurality of operational elements of the first planetary gear set through a third input shaft; a second planetary gear set integrally combined with the first planetary gear set, so as to output the power of the engine, transmitted from the first planetary gear set, to a driving wheel through an output shaft or to directly output the power of a second motor for driving to the driving wheel through the output shaft; the second motor connected to any one of operational elements of the second planetary gear set so as to directly output the power of the engine to the driving wheel; and a battery to or from which electric power generated through charging/discharging of the first and second motors driven by the power of the engine is input/output.

In an exemplary embodiment, the first planetary gear set may be employed as a single pinion planetary gear, and the second planetary gear set may be employed as a double pinion planetary gear, thereby implementing a Ravigneaux gear train obtained by integrating the single pinion planetary gear and the double pinion planetary gear.

In another exemplary embodiment, a first ring gear of the first planetary gear set and a second ring gear of the second planetary gear set may be integrally connected on the same line. A first carrier of the first planetary gear set and a (2-1)-th carrier of the second planetary gear set may be integrally connected on the same line. A first line gear may be independently connected to the first carrier of the first planetary gear set, a (2-2)-th carrier may be independently connected to the (2-1)-th carrier of the second planetary gear set, and a second line gear may be independently connected to the (2-2)-th carrier.

In still another exemplary embodiment, the second input shaft extended from the first clutch may be connected to the first carrier of the first planetary gear set. The third input shaft extended from the second clutch may be connected to the first ring gear of the first planetary gear set. The second motor may be connected to the second line gear of the second planetary gear set.

In yet another exemplary embodiment, the rotational power generated by independent driving of the second motor may be output to the driving wheel while being reduced through the second line gear, the (2-2)-th carrier, the (2-1)-th carrier and the second ring gear of the second planetary gear set in a state in which the first and second clutches are unengaged, thereby implementing an EV driving mode.

In still yet another exemplary embodiment, the first motor may act as a starter to start the engine while the EV driving mode is being implemented in the state in which the first and second clutches are unengaged, thereby implementing a first HEV driving mode in which the first motor is driven by the power of the engine so as to generate electric power, and simultaneously, the generated electric power is charged in the battery.

In a further exemplary embodiment, the second clutch may be engaged in the driving of the engine, thereby implementing a second HEV driving mode in which the power of the engine is output to the driving wheel through the first ring gear of the first planetary gear set and the second ring gear of the second planetary gear set, and simultaneously, the torque control of the first and second motors is performed.

In another further exemplary embodiment, the first clutch may be engaged in the driving of the engine, thereby implementing a third HEV driving mode in which the power of the engine is increased through the first carrier of the first planetary gear set and the (2-1)-th carrier of the second planetary gear set, which are integrally connected to each other, and then output to the driving wheel through the second ring gear, and simultaneously, the torque control of the first and second motors is performed.

Other aspects and exemplary embodiments of the invention are discussed infra.

According to the present invention, the power transmission device and system for the hybrid vehicle capable of performing series-parallel power transmission including the first to third HEV driving modes as well as the EV driving mode can be implemented using a Ravigneaux gear train obtained by integrating a single pinion planetary gear and a double pinion planetary gear and two or more clutches. In this case, a first ring gear of the single pinion planetary gear and a second ring gear of the double pinion planetary gear are integrally connected, and simultaneously, a first carrier of the single pinion planetary gear and a (2-1)-th carrier (one of two pinion gears) of the double pinion planetary gear are integrally connected.

Particularly, two or more kinds of engine fixing gear stages can be selected using two clutches, thereby improving fuel efficiency in the parallel driving that requires engine power.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
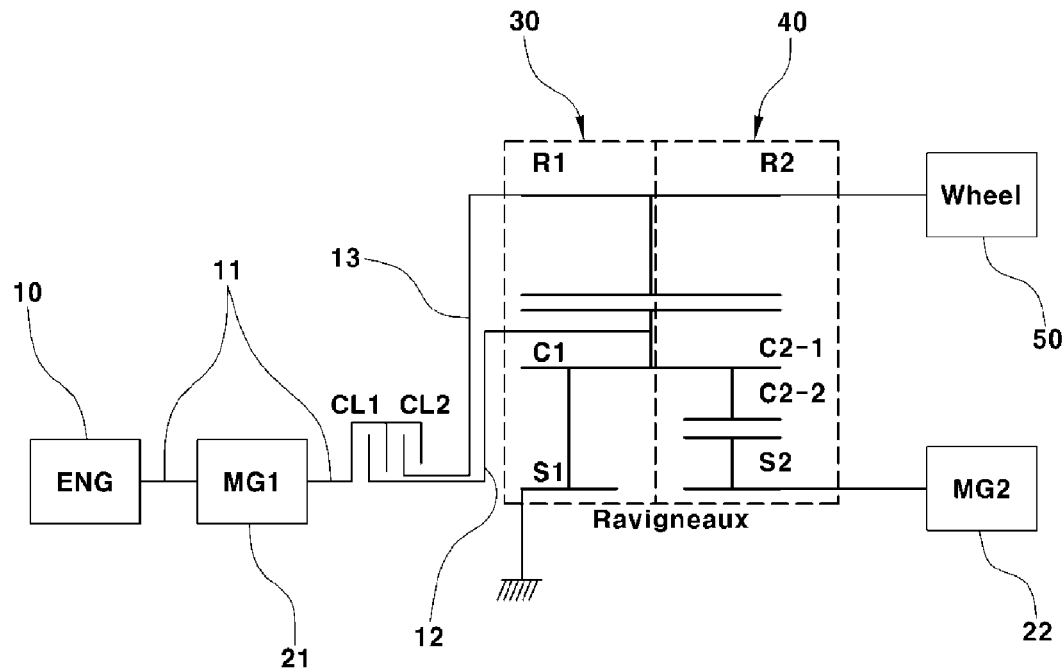
FIG. 1 is a power transmission system diagram showing a power transmission device for a hybrid vehicle according to the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Further, as provided herein, environmentally-friendly vehicles include fuel cell vehicles, electric vehicles, plug-in electric vehicles, and hybrid vehicles, and the like, and preferably are equipped with one or more motors and an engine.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Figure 2:
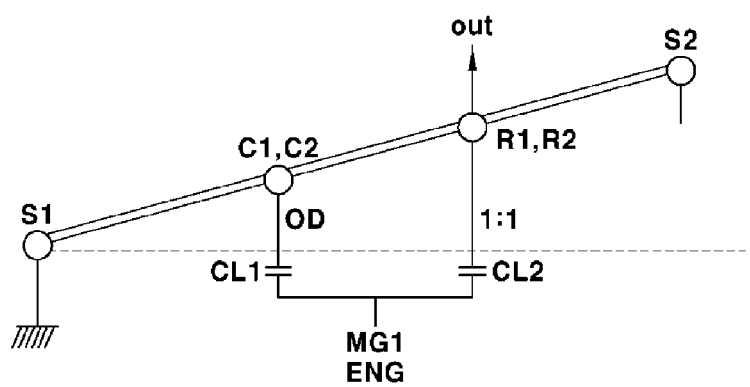
FIG. 2 is a schematic view showing a lever line of the power transmission device of FIG. 1.
Figure 3:
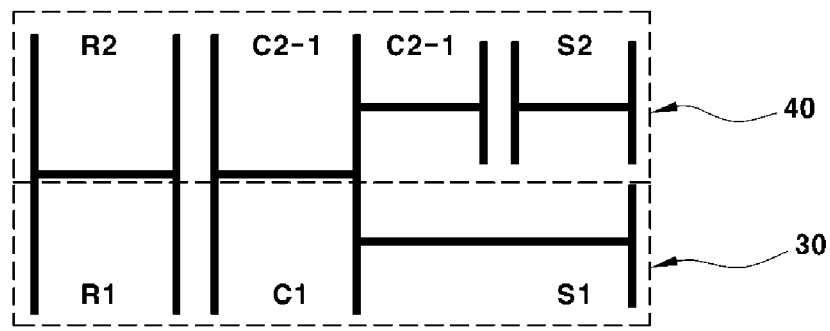
FIG. 3 is a schematic view showing only a Ravigneaux gear train applied to the power transmission device of FIG. 1.

Referring to FIGS. 1 to 3, a first input shaft 11 from an engine 10 is directly connected to a first motor 21 for generation on the same axle, and a Ravigneaux gear train in which a first planetary gear set 30 and a second planetary gear set 40 are combined by the medium of a pair of clutches is connected to the first input shaft 11 extended from the engine 10 via the first motor 21, so that power of the engine 10 can be transmitted from the Ravigneaux gear train to the first input shaft 11.

In the Ravigneaux gear train of the present invention, the first planetary gear set 30 is employed as a single pinion planetary gear, and the second planetary gear set is employed as a double pinion planetary gear including a carrier configured with two pinion gears. Thus, the Ravigneaux gear train has a structure in which the first planetary gear set 30 and the second planetary gear set 40 are integrally connected.

More specifically, a first ring gear R1 of the first planetary gear set 30 and a second ring gear R2 of the second planetary gear set 40 are integrally connected on the same line, and a first carrier C1 of the first planetary gear set 30 and a (2-1)-th carrier C2-1 of the second planetary gear set 40 are integrally connected on the same line.

The other operational elements of the first planetary gear set 30, except the first ring gear R1 and the first carrier C1, and the other operational elements of the second planetary gear set 40, except the second ring gear R2 and the (2-1)-th carrier C2-1, are provided independently. In particular, a pinion of the first carrier C1 of the first planetary gear set 30 is independently engaged with a first line gear S1, and a pinion of a (2-2)-th carrier C2-2 is independently engaged with a pinion of the (2-1)-th carrier C2-1 of the second planetary gear set 40. In addition, a second line gear S2 of the second planetary gear set 40 is independently engaged with the pinion of the (2-2)-th carrier C2-2.

In this case, first and second clutches CL1 and CL2 are mounted in parallel at an end portion of the first input shaft 11 extended from the engine 10 via the first motor 21. The first clutch CL1 performs an operation of transmitting or disconnecting power of the engine 10 to or from any one of the operational elements of the first planetary gear set 30 through a second input shaft 12 extended from the first clutch CL1. Preferably, the second input shaft 12 extended from the first clutch CL1 is connected to the first carrier C1 among the operational elements of the first planetary gear set 30 so that power of the engine 10 can be transmitted from the second input shaft 12 to the first carrier C1.

The second clutch CL2 performs an operation of transmitting or disconnecting the power of the engine 10 to or from another of the operational elements of the first planetary gear set 30 through a third input shaft 13 extended from the second clutch CL2. Preferably, the third input shaft 13 extended from the second clutch CL2 is connected to the first ring gear R1 among the operational elements of the first planetary gear set 30 so that power of the engine 10 can be transmitted from the input shaft 13 to the first ring gear R1.

Meanwhile, the second motor 22 is connected to any one of the operational elements of the second planetary gear set 40 so as to directly output power of the motor to a driving wheel 50. Preferably, the second motor 22 is connected to the second line gear S2 among the operational elements of the second planetary gear set 40 so that power of the engine 10 can be transmitted from the second motor 22 to the second line gear S2.

Hereinafter, the power transmission flow of the power transmission device according to the present invention configured as described above will be described for each driving mode.

Figure 4:
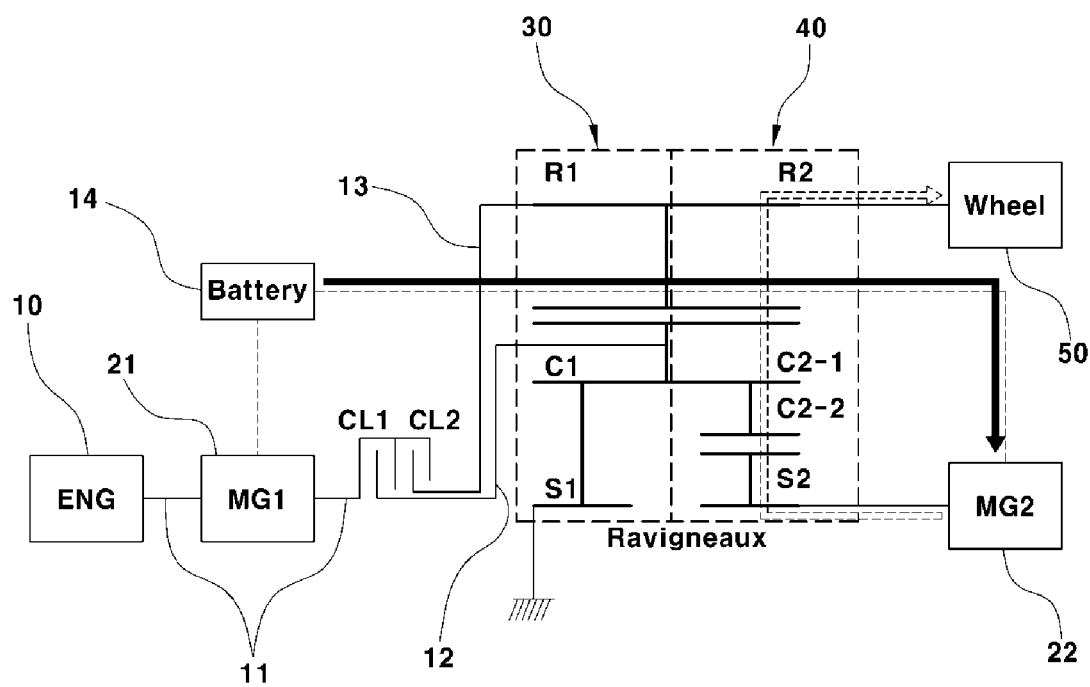
FIG. 4 is a schematic view showing the flow of power in an EV driving mode of the power transmission device of FIG. 1.

EV Driving Mode (See FIGS. 2 and 4)

The EV driving mode is a driving mode performed with only power of the second motor 22. To this end, only the second motor 22 is independently driven while receiving electric power supplied from a battery 14 in a state in which the first and second clutches CL1 and CL2 are unengaged.

In the EV driving mode, an under drive (UD) fixing gear stage is implemented, and thus the rotational speed of the second motor 22 is reduced to be output to the driving wheel 50. In particular, the rotative power produced by driving the second motor 22 is reduced by sequentially passing through the second line gear S2, the (2-2)-th carrier C2-2, the (2-1)-th carrier C2-1 and the second ring gear R2 of the second planetary gear set 40, and then finally output to the driving wheel 50, thereby performing initial driving of the vehicle.

Figure 5:
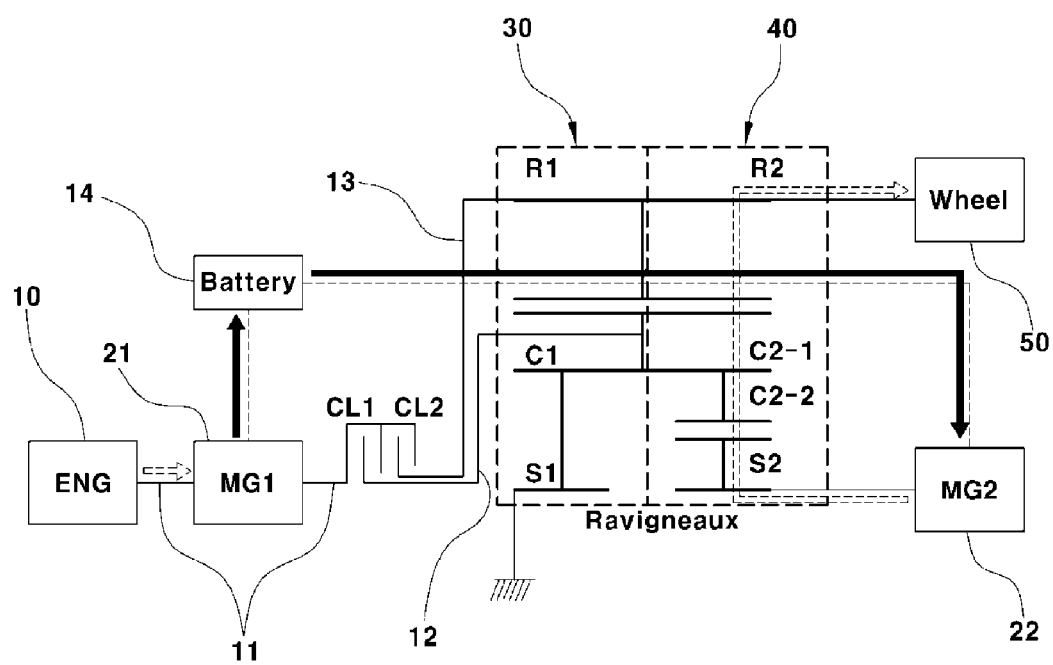
FIG. 5 is a schematic view showing the flow of power in a first HEV driving mode of the power transmission device of FIG. 1.

First HEV Driving Mode (See FIGS. 2 and 5)

The first HEV driving mode is a driving mode in which when the vehicle is driven by the power of the second motor 22, the engine 10 is started so that the battery 14 is charged. To this end, the first motor 21 serves as a starter for the engine 10.

If the engine 10 is started by driving the starter of the first motor 21 while the vehicle is being driven by the power of the second motor 22 in a state in which the first and second clutches CL1 and CL2 are unengaged, the power of the engine 10 drives the first motor 21 keeping the same axle through the first input shaft 11, and electric power generated by driving the first motor 21 is charged in the battery 14.

In this case, the electric power charged in the battery 14 or electric power retained in the battery is continuously supplied to the second motor 22.

Figure 6:
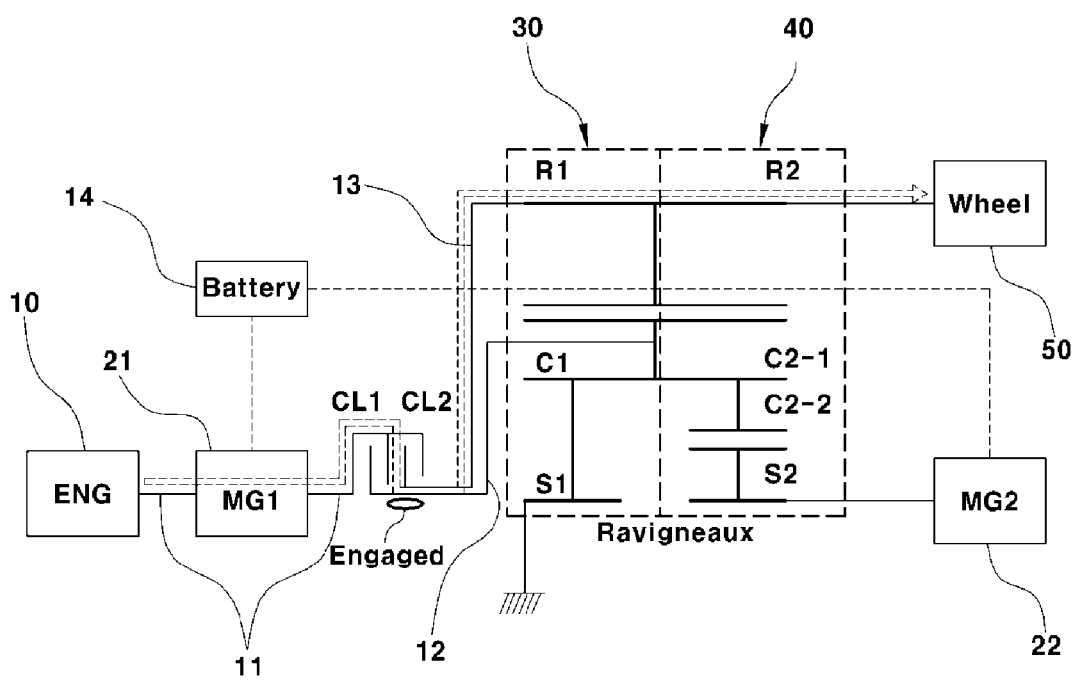
FIG. 6 is a schematic view showing the flow of power in a second HEV driving mode of the power transmission device of FIG. 1.

Second HEV Driving Mode (See FIGS. 2 and 6)

In the second HEV driving mode, the first clutch CL1 is unengaged, and the second clutch CL2 is engaged to transmit power of the engine 10.

If the second clutch CL2 is engaged, the first input shaft 11 from the engine 10 is synchronized with the third input shaft 13 extended from the second clutch CL2 to the first ring gear R1 of the first planetary gear set 30.

Thus, the power of the engine 10 is input to the first ring gear R1 of the first planetary gear set 30 through the first and third input shafts 11 and 13 synchronized by the second clutch CL2, and then output to the driving wheel 50 through the second ring gear R2 of the second planetary gear set 40, integrated with the first ring gear R1.

As such, there is a 1:1 engine fixing gear stage in which the output of the engine 10 is transmitted as it is to the driving wheel 50 by the engagement of the second clutch CL2 in the second HEV driving mode.

In the second HEV driving mode, the torque control of the first and second motors 21 and 22 is performed, so that it is possible to control the output of the engine 10, which is transmitted from the engine 10 to the driving wheel 50.

Figure 7:
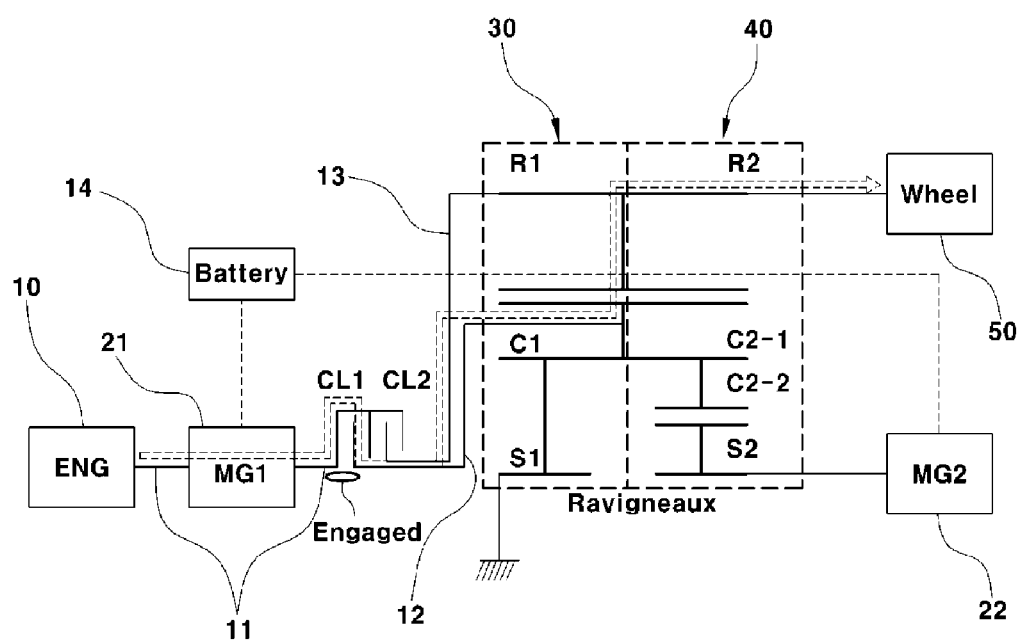
FIG. 7 is a schematic view showing the flow of power in a third HEV driving mode of the power transmission device of FIG. 1.
Figure 8:
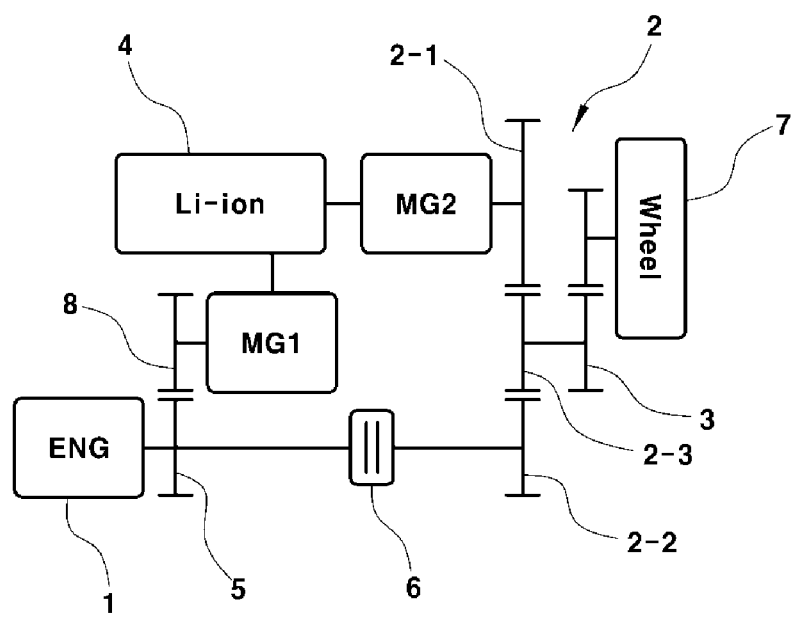
FIG. 8 (RELATED ART) is a power transmission system diagram showing a conventional power transmission device for a hybrid vehicle.

Third HEV Driving Mode (See FIGS. 2 and 7)

In the third HEV driving mode, the second clutch CL2 is unengaged, and the first clutch CL1 is engaged to transmit power of the engine 10.

If the first clutch CL1 is engaged, the first input shaft 11 from the engine 10 is synchronized with the second input shaft 12 extended from the first clutch CL1 to the first carrier C1 of the first planetary gear set 30.

Thus, the power of the engine 10 is input to the first carrier C1 of the first planetary gear set 30 through the first and second input shafts 11 and 12 synchronized by the first clutch CL1, and then output to the driving wheel 50 through the (2-1)-th carrier C2-1 of the second planetary gear set 40, integrated with the first carrier C1, and the second ring gear R2. In this case, the first carrier C1 and the (2-1)-th carrier C2-1 function to increase the rotational power of the engine 10.

As such, there is implemented an over drive (OD) fixing gear stage in which the output of the engine 10 is increased and transmitted to the driving wheel 50 by the engagement of the first clutch CL1 in the third HEV driving mode.

In the third HEV driving mode, the torque control of the first and second motors 21 and 22 is also performed, so that the output of the engine 10, transmitted from the engine 10 to the driving wheel 50, can be implemented in the optimum driving point.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A power transmission device for a hybrid vehicle, comprising:
    an engine;
    a first motor for generation, connected to a first input shaft from the engine on a same axle;
    a first planetary gear set connected to the first input shaft extended from the engine via the first motor so that power of the engine is transmitted from the first planetary gear set to the first input shaft;
    a first clutch mounted at an end portion of the first input shaft, so as to transmit or disconnect the power of the engine to or from any one of a plurality of operational elements of the first planetary gear set through a second input shaft;
    a second clutch mounted at the end portion of the first input shaft, so as to transmit or disconnect the power of the engine to or from another of the plurality of operational elements of the first planetary gear set through a third input shaft;
    a second planetary gear set integrally combined with the first planetary gear set, so as to output the power of the engine, transmitted from the first planetary gear set, to a driving wheel through an output shaft or to directly output the power of a second motor for driving to the driving wheel through the output shaft;
    the second motor connected to any one of operational elements of the second planetary gear set so as to directly output the power of the engine to the driving wheel; and
    a battery to or from which electric power generated through charging/discharging of the first and second motors driven by the power of the engine is input/output.

2. The power transmission device of claim 1, wherein a first ring gear of the first planetary gear set and a second ring gear of the second planetary gear set are integrally connected on the same line,
    wherein a first carrier of the first planetary gear set and a (2-1)-th carrier of the second planetary gear set are integrally connected on the same line, and
    wherein a first line gear is independently connected to the first carrier of the first planetary gear set, a (2-2)-th carrier is independently connected to the (2-1)-th carrier of the second planetary gear set, and a second line gear is independently connected to the (2-2)-th carrier.

3. The power transmission device of claim 1, wherein the second input shaft extended from the first clutch is connected to a first carrier of the first planetary gear set.

4. The power transmission device of claim 1, wherein the third input shaft extended from the second clutch is connected to a first ring gear of the first planetary gear set.

5. The power transmission device of claim 1, wherein the rotational power generated by independent driving of the second motor is output to the driving wheel while being reduced through the second line gear, a (2-2)-th carrier, a (2-1)-th carrier and a second ring gear of the second planetary gear set in a state in which the first and second clutches are unengaged, thereby implementing an EV driving mode.

6. The power transmission device of claim 1, wherein the first motor acts as a starter to start the engine while the EV driving mode is being implemented in the state in which the first and second clutches are unengaged, thereby implementing a first HEV driving mode in which the first motor is driven by the power of the engine so as to generate electric power, and simultaneously, the generated electric power is charged in the battery.

7. The power transmission device of claim 1, wherein the second clutch is engaged in the driving of the engine, thereby implementing a second HEV driving mode in which the power of the engine is output to the driving wheel through a first ring gear of the first planetary gear set and a second ring gear of the second planetary gear set, and simultaneously, the torque control of the first and second motors is performed.

8. The power transmission device of claim 1, wherein the first clutch is engaged in the driving of the engine, thereby implementing a third HEV driving mode in which the power of the engine is increased through a first carrier of the first planetary gear set and a (2-1)-th carrier of the second planetary gear set, which are integrally connected to each other, and then output to the driving wheel through a second ring gear, and simultaneously, the torque control of the first and second motors is performed.

9. The power transmission device of claim 1, wherein the first planetary gear set is employed as a single pinion planetary gear, and the second planetary gear set is employed as a double pinion planetary gear, thereby implementing a Ravigneaux gear train obtained by integrating the single pinion planetary gear and the double pinion planetary gear.

10. The power transmission device of claim 9, wherein a first ring gear of the first planetary gear set and a second ring gear of the second planetary gear set are integrally connected on the same line,
    wherein a first carrier of the first planetary gear set and a (2-1)-th carrier of the second planetary gear set are integrally connected on the same line, and
    wherein a first line gear is independently connected to the first carrier of the first planetary gear set, a (2-2)-th carrier is independently connected to the (2-1)-th carrier of the second planetary gear set, and a second line gear is independently connected to the (2-2)-th carrier.

11. The power transmission device of claim 1, wherein the second motor is connected to the second line gear of the second planetary gear set.

12. The power transmission device of claim 11, wherein the first motor acts as a starter to start the engine while the EV driving mode is being implemented in the state in which the first and second clutches are unengaged, thereby implementing a first HEV driving mode in which the first motor is driven by the power of the engine so as to generate electric power, and simultaneously, the generated electric power is charged in the battery.

13. A hybrid vehicle, comprising:
    a power transmission device, comprising:
    an engine;
    a first motor for generation, connected to a first input shaft from the engine on a same axle;
    a first planetary gear set connected to the first input shaft extended from the engine via the first motor so that power of the engine is transmitted from the first planetary gear set to the first input shaft;
    a first clutch mounted at an end portion of the first input shaft, so as to transmit or disconnect the power of the engine to or from any one of a plurality of operational elements of the first planetary gear set through a second input shaft;
    a second clutch mounted at the end portion of the first input shaft, so as to transmit or disconnect the power of the engine to or from another of the plurality of operational elements of the first planetary gear set through a third input shaft; and
    a second planetary gear set integrally combined with the first planetary gear set, so as to output the power of the engine, transmitted from the first planetary gear set, to a driving wheel through an output shaft or to directly output the power of a second motor for driving to the driving wheel through the output shaft,
    wherein the second motor is connected to any one of operational elements of the second planetary gear set so as to directly output the power of the engine to the driving wheel.

14. The hybrid vehicle of claim 13, wherein the first planetary gear set is employed as a single pinion planetary gear, and the second planetary gear set is employed as a double pinion planetary gear, thereby implementing a Ravigneaux gear train obtained by integrating the single pinion planetary gear and the double pinion planetary gear.

15. The hybrid vehicle of claim 14, wherein a first ring gear of the first planetary gear set and a second ring gear of the second planetary gear set are integrally connected on the same line,
    wherein a first carrier of the first planetary gear set and a (2-1)-th carrier of the second planetary gear set are integrally connected on the same line, and
    wherein a first line gear is independently connected to the first carrier of the first planetary gear set, a (2-2)-th carrier is independently connected to the (2-1)-th carrier of the second planetary gear set, and a second line gear is independently connected to the (2-2)-th carrier.

16. The hybrid vehicle of claim 13, wherein the second input shaft extended from the first clutch is connected to a first carrier of the first planetary gear set.

17. The hybrid vehicle of claim 13, wherein the third input shaft extended from the second clutch is connected to a first ring gear of the first planetary gear set.

18. The hybrid vehicle of claim 13, wherein the second motor is connected to a second line gear of the second planetary gear set.

* * * * *